(12) United States Patent
Hancock

(10) Patent No.: US 9,765,756 B2
(45) Date of Patent: Sep. 19, 2017

(54) SECTIONAL BLADE

(75) Inventor: Mark Hancock, Southampton (GB)

(73) Assignee: Vestas Wind Systems A/S, Aarhus N. (DK)

( * ) Notice: Subject to any disclaimer, the term of this patent is extended or adjusted under 35 U.S.C. 154(b) by 1222 days.

(21) Appl. No.: 12/991,370

(22) PCT Filed: May 7, 2009

(86) PCT No.: PCT/EP2009/055541
§ 371 (c)(1),
(2), (4) Date: Dec. 16, 2010

(87) PCT Pub. No.: WO2009/135902
PCT Pub. Date: Nov. 12, 2009

(65) Prior Publication Data
US 2011/0091326 A1 Apr. 21, 2011

Related U.S. Application Data

(60) Provisional application No. 61/126,998, filed on May 7, 2008.

(30) Foreign Application Priority Data

May 7, 2008 (DK) .................................. 2008 00649

(51) Int. Cl.
F03D 1/06 (2006.01)
(52) U.S. Cl.
CPC ......... *F03D 1/0683* (2013.01); *F03D 1/0675* (2013.01); *F05B 2230/50* (2013.01);
(Continued)

(58) Field of Classification Search
CPC .... F03D 1/0675; F03D 1/068; F05B 2240/21; F05B 2240/302
(Continued)

(56) References Cited

U.S. PATENT DOCUMENTS 2,259,247 A 10/1941 Dornier
4,120,998 A 10/1978 Olez
(Continued)

FOREIGN PATENT DOCUMENTS

CA 1 151 072 8/1983
DE 10 2007 020 439 10/2007
(Continued)

OTHER PUBLICATIONS

Translation of JP20040011616A.*
(Continued)

*Primary Examiner* — Justin Seabe
(74) *Attorney, Agent, or Firm* — Wood Herron & Evans LLP

(57) ABSTRACT

The invention provides a sectional blade for a wind turbine. The blade comprises at least a first blade portion and a second blade portion extending in opposite directions from a joint. Further each blade portion comprises a spar section forming a structural member of the blade and running lengthways. The first blade portion and the second blade portion are structurally connected by at least one spar bridge extending into both blade portions to facilitate joining of said blade portions and the spar bridge joins the spar sections.

18 Claims, 11 Drawing Sheets

(52) U.S. Cl.
CPC ... *F05B 2240/302* (2013.01); *F05B 2250/292* (2013.01); *F05B 2260/301* (2013.01); *Y02E 10/721* (2013.01); *Y02P 70/523* (2015.11); *Y10T 29/49336* (2015.01)

(58) Field of Classification Search
USPC ... 416/62, 132 R, 132 B, 225, 226, 232, 233
See application file for complete search history.

(56) References Cited

U.S. PATENT DOCUMENTS

| | | | |
|---|---|---|---|
| 4,429,579 A * | 2/1984 | Wilhelm | 73/768 |
| 5,129,787 A * | 7/1992 | Violette et al. | 416/226 |
| 6,514,043 B1 | 2/2003 | Rasmussen et al. | |
| 6,619,918 B1 * | 9/2003 | Rebsdorf | 416/1 |
| 6,638,466 B1 | 10/2003 | Abbott | |
| 7,186,086 B2 | 3/2007 | Yoshida | |
| 7,246,991 B2 * | 7/2007 | Bosche | 415/14 |
| 7,334,989 B2 | 2/2008 | Arelt | |
| 7,591,621 B1 | 9/2009 | Landrum et al. | |
| 7,854,594 B2 * | 12/2010 | Judge | 416/226 |
| 8,100,660 B2 * | 1/2012 | Vronsky et al. | 416/224 |
| 8,167,569 B2 * | 5/2012 | Livingston | 416/224 |
| 8,171,633 B2 | 5/2012 | Zirin et al. | |
| 8,177,515 B2 * | 5/2012 | Hibbard | 416/226 |
| 8,221,085 B2 * | 7/2012 | Livingston et al. | 416/226 |
| 2003/0138290 A1 | 7/2003 | Wobben | |
| 2005/0013694 A1 | 1/2005 | Kovalsky et al. | |
| 2005/0175457 A1 | 8/2005 | Yoshida | |
| 2007/0025856 A1 | 2/2007 | Moroz | |
| 2007/0253824 A1 | 11/2007 | Eyb | |
| 2008/0069699 A1 | 3/2008 | Bech | |
| 2008/0145231 A1 | 6/2008 | Llorente Gonzales et al. | |
| 2008/0219851 A1 * | 9/2008 | Althoff et al. | 416/226 |
| 2009/0068017 A1 | 3/2009 | Rudling | |
| 2009/0072088 A1 | 3/2009 | Ashton et al. | |
| 2009/0116962 A1 | 5/2009 | Pedersen et al. | |
| 2009/0136355 A1 | 5/2009 | Finnigan et al. | |
| 2009/0155084 A1 | 6/2009 | Livingston et al. | |
| 2009/0169390 A1 | 7/2009 | Nies | |
| 2010/0272570 A1 | 10/2010 | Arocena De La Rua et al. | |
| 2011/0020126 A1 * | 1/2011 | Glenn et al. | 416/223 A |

FOREIGN PATENT DOCUMENTS

| | | |
|---|---|---|
| DE | 60312816 T2 | 2/2008 |
| DE | 102008055540 A1 | 6/2009 |
| EP | 1 500 814 | 1/2005 |
| EP | 1 584 817 | 10/2005 |
| EP | 1 878 915 A2 | 1/2008 |
| EP | 1 950 414 | 7/2008 |
| JP | 2003-214322 | 7/2003 |
| JP | 2004/011616 | 1/2004 |
| JP | 2004011616 A * | 1/2004 |
| JP | 2005/147086 | 6/2005 |
| JP | 2005/240783 | 9/2005 |
| WO | 2006/005944 | 1/2006 |
| WO | 2006002621 A1 | 1/2006 |
| WO | WO 2006/056584 | 6/2006 |
| WO | WO 2008/012615 | 1/2008 |
| WO | 2009034291 A2 | 3/2009 |
| WO | 2009059604 A1 | 5/2009 |
| WO | 2009090537 A2 | 7/2009 |
| WO | 2009/135902 | 11/2009 |

OTHER PUBLICATIONS

International Search Report, Danish priority patent application No. PA 2008 00649.
David Biloen; International Search Report issued in priority International Application No. PCT/EP2009/061180; Nov. 4, 2010; 6 pages; European Patent Office.
Carsten Nielsen; 1st Technical Examination Report issued in priority Denmark Application No. PA 2008 01208; Apr. 15, 2009; 4 pages; Denmark Patent and Trademark Office.
U.S. Patent and Trademark Office, Office Action issued in U.S. Appl. No. 13/060,744; Sep. 3, 2013; 23 pages.
U.S. Patent and Trademark Office, Final Office Action issued in U.S. Appl. No. 13/060,744; Feb. 27, 2014; 22 pages.
U.S. Patent and Trademark Office, Final Office Action issued in U.S. Appl. No. 13/060,744; Mar. 28, 2014; 23 pages.
European Patent Office, International Search Report in PCT Application No. PCT/EP2010/068712, Oct. 11, 2011.
European Patent Office, International Preliminary Report on Patentability in PCT Application No. PCT/EP2010/068712, Mar. 12, 2012.
Danish Patent and Trademark Office, Office Action in Danish Application No. PA 2009 70240, Jul. 2, 2010.
U.S. Patent and Trademark Office, Final Office Action in U.S. Appl. No. 13/513,002, Nov. 5, 2015.
U.S. Patent and Trademark Office, Office Action in U.S. Appl. No. 13/513,002, May 8, 2015.
European Patent Office, Communication of a Notice of Opposition issued in Application No. 09742120.0 dated Jun. 26, 2014.
Design, Structural Testing, and Cost Effectiveness of Sectional Wind Turbine Blades (Publishable Final Report), Publishable Final Report, Aug. 1, 1997-Nov. 30, 2000, Research funded in part by the European Commission in the framework of the Non-Nuclear Energy Programme, Joule III.

* cited by examiner

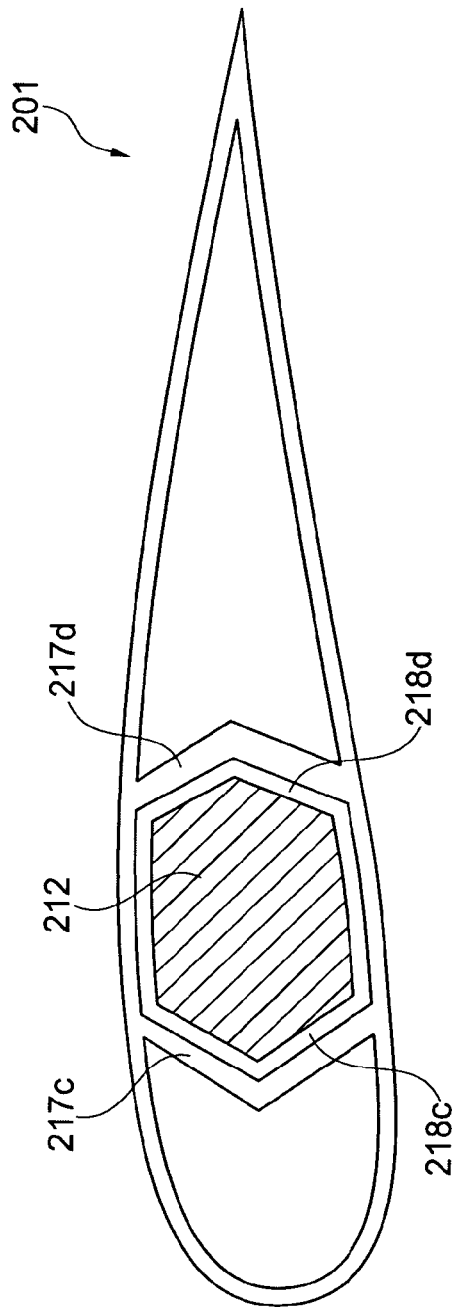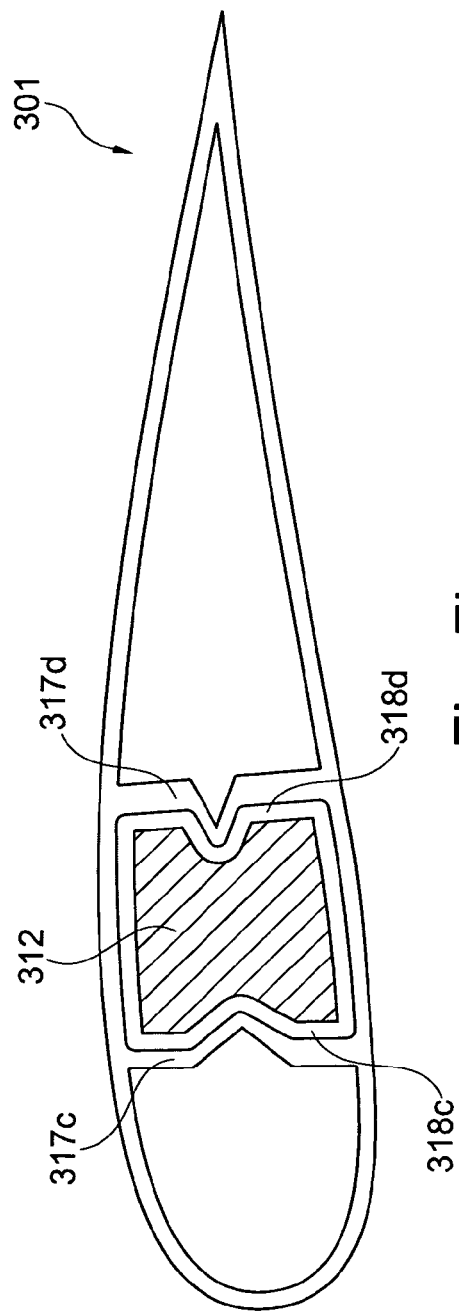

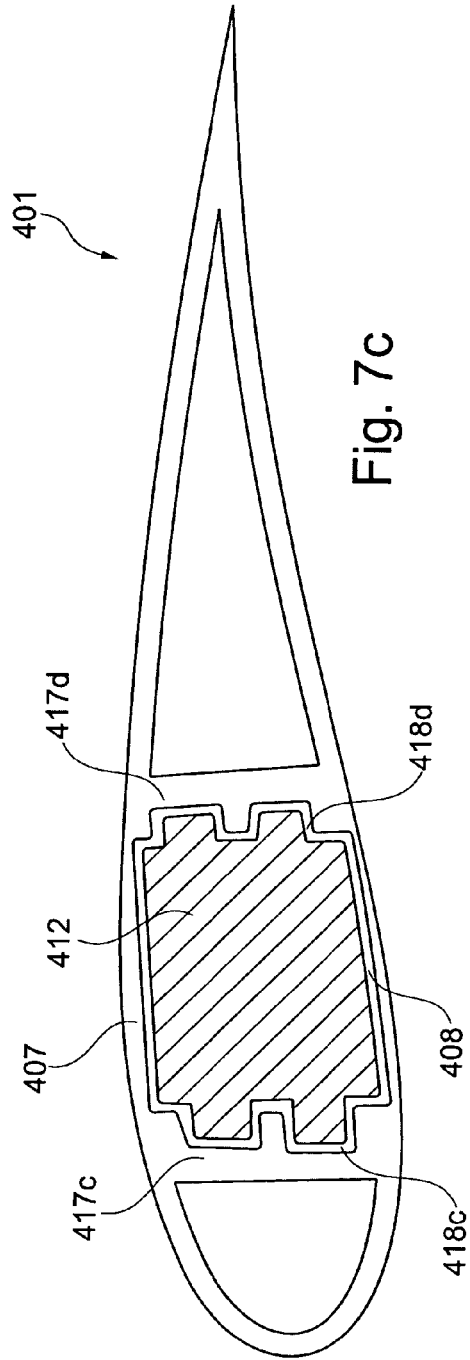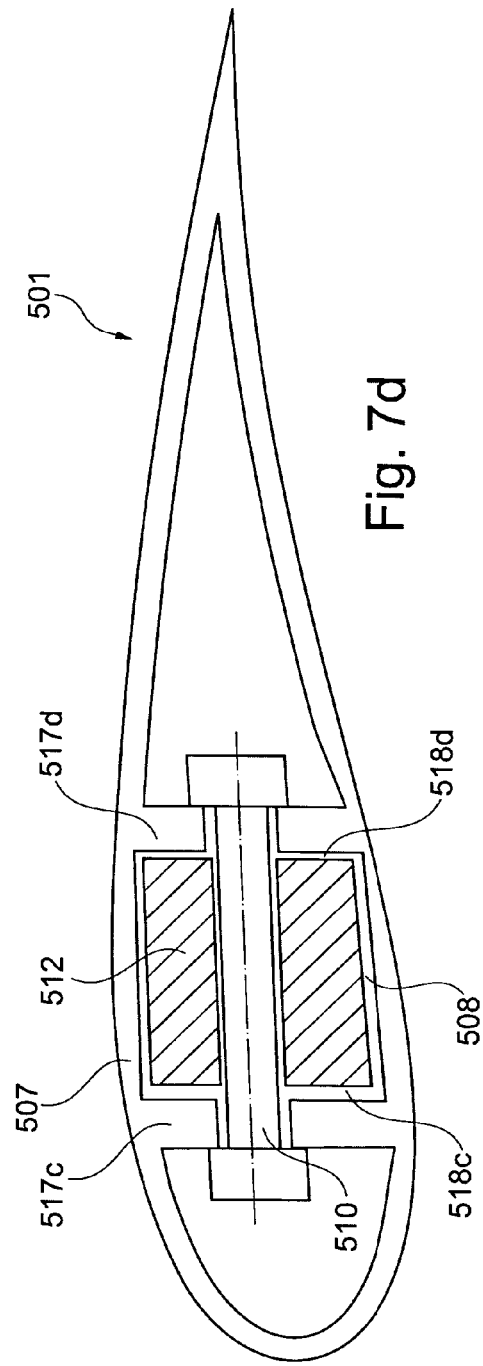

SECTIONAL BLADE

PRIORITY CLAIM

This is a U.S. national stage of application No. PCT/EP2009/055541, filed on May 7, 2009. Priority is claimed on the following applications: Denmark Application No.: PA 2008 00649, Filed: May 7, 2008; and U.S. Application No. 61/126,998, Filed: May 7, 2008; the content of which are incorporated here by reference.

TECHNICAL FIELD

The present invention relates to a sectional blade for a wind turbine, the blade comprising at least a first and a second blade portion extending in opposite directions from a joint.

BACKGROUND OF THE INVENTION

Modern wind turbines comprise a plurality of wind turbine rotor blades, typically three blades, each blade having a weight of up to 15 tons and a length of up to 55 meters.

Traditionally, a blade comprises two shell parts, one defining a windward side shell part and the other one defining a leeward side shell part. Each of the shell parts are traditionally made in one piece. To reinforce such a blade, a beam- or box-shaped, longitudinal and tubular element, i.e. a spar, can act as a reinforcing beam running lengthways, i.e. in the longitudinal direction of the blade. The spar is located in the cavity between the two wind turbine shell parts and extends substantially throughout the shell cavity in order to increase the strength and stiffness of the wind turbine blade. A blade may further be reinforced by two or more spars placed lengthways side by side.

As the size of wind turbines and thus wind turbine blades are still growing, the production facilities and the transport means must be increased to handle blades of the required size. This also increases the demand on logistics and increases the associated costs.

SUMMARY OF THE INVENTION

It is an object of embodiments of the present invention to provide an improved wind turbine blade comprising at least two portions and to provide an improved method of manufacturing such a blade.

In a first aspect, the invention provides a sectional blade for a wind turbine, the blade comprising at least a first blade portion and a second blade portion extending in opposite directions from a joint, where each blade portion comprises a spar section forming a structural member of the blade and running lengthways, the first blade portion and the second blade portion being structurally connected by at least one spar bridge extending into both blade portions to facilitate joining of said blade portions, and where the spar bridge joins the spar sections.

The spar sections may each reinforce a blade portion, as a traditional spar acting as a reinforcing beam in a traditional wind turbine blade.

In a preferred embodiment, the joint between the two blade portions may be transverse to the length of the blade, thus allowing for a blade comprising smaller sections compared to a traditional blade being manufactured of shell parts of full-size.

The blade portions may be smaller than normal blade shells, and the blade portions may be easier to transport from a manufacturing site to an assembly site for being assembled, compared to blades in one piece. Furthermore, the assembly site can be situated close to the place where the turbine blade it to be used.

By manufacturing the blade of different parts, these parts may be transported unassembled, thereby facilitating transport with the possibility of reducing the associated costs.

The joint may be approximately at the middle part of the blade providing blade portions of approximately the same length. However, the blade portions may also be of different length. As an example, the first blade portion may define a main blade portion, whereas the second blade portion may define a tip portion.

In an embodiment of the invention the second blade portion may form a winglet. Winglets can attain different shapes such as e.g. a sharply bent tip in an angle from a few degrees to 90° relative to the lengthwise direction of the blade, or such as a gradually bent tip. Hereby is obtained that the blade may be transported in parts which may e.g. be relatively flat compared to a traditional blade with winglet, thereby facilitating transport with the possibility of reducing the associated costs.

The blade tip influences the performance of the wind turbine blade as well as the noise emission. By detachable mounting of the winglet to the rest of the blade, is obtained e.g. that the blade tip may by exchanged on existing wind turbines to thereby adjust the wind turbine performance or noise emission by attaching tips extending in different angles relative to the lengthwise direction of the blade or tips of different size and/or shape. Also, as the blade tip is often vulnerable to damage during transport, handling, or operation, a detachable blade tip or winglet according to the above may furthermore be advantageous in facilitating the exchange of a damaged blade tip.

Furthermore, the blade may comprise more than one joint and thus comprise more than two blade portions and more than one spar bridge for each joint.

Each blade portion may comprise two shell parts, one defining a windward side shell part and the other one defining a leeward side shell part. These shell parts may be assembled before joining the first and second blade portions.

The first blade portion and the second blade portion are structurally connected by at least one spar bridge extending into both blade portions to facilitate joining of said blade portions.

The spar bridge may be a longitudinal element which may be box-shaped, cylindrical, or of any other shape such as e.g. an I-beam shape. It may form part of the longitudinal strength of the wind turbine blade, thus being part of the reinforcement of the blade.

Furthermore, the spar bridge may be a solid, a partly solid, or a tubular element. It should be understood, that by "tubular element" is in this connection meant a hollow element with an elongated shape. The shape may be non-uniform. The outer geometry may be of a rectangular shape, a partly circular shape, an oval shape or any other shape. The inner geometry may (if any) be different from the outer shape, thus defining a tubular element in the form of an elongated ring of an arbitrary shape.

The spar sections may have an elongated form and may be hollow facilitating that the spar bridge may be received in the spar sections. As an example, the spar bridge may be inserted partly in both of the spar sections allowing the blade sections to be joined around the spar bridge. I.e. one or both of the spar sections may form a cavity, and the spar bridge may extend into the cavity.

In another embodiment, the spar bridge may partly overlap each of the spar sections without being received in the spar sections and thus facilitate joining of two adjacent blade portions.

The spar bridge may in one embodiment form part of one of the blade portions and may thus not be a separate element. Furthermore, the spar bridge may comprise an extension protruding from one of the spar sections and may thereby form an extending spar section, and the other one of the spar sections may be adapted to receive the extension, and may thereby form a receiving spar section.

The spar sections may be substantially rectangular, or I-shaped, e.g. with rounded corners. Consequently, a receiving spar section may comprise two receiving spar caps joined with two or more receiving webs. As the extending spar section may be received in the receiving spar section, the extending spar caps and the receiving spar caps may overlap each other along at least a part of the length of the extending spar section. To limit the material thickness of the overlapping spar caps, the thickness of the receiving spar caps may be tapered down towards the joint, i.e. along at least a part of the length of the receiving spar section.

To facilitate that the extending spar section may be received in the receiving spar section, the spar bridge may terminate axially in an end at which it has a cross-section which is small relative to that of a mid section at the joint.

Further, the spar bridge may comprise two extending spar caps joined with one or more extending webs. The extending spar caps may form an upper and a lower surface of the substantially rectangular form, or the flanges of an I-beam. These extending spar caps may thus be joined with the one or more extending webs being positioned substantially vertically to form spar sections being substantially rectangular or I-beam shaped.

To limit the material thickness of the extending and receiving spar caps where they overlap each other, the thickness of some of the caps, e.g. the extending spar caps, may be tapered down away from the joint, i.e. along at least a part of the length of the extending spar section. "Tapered" herein means that the thickness is reduced either gradually or stepwise.

In a specific embodiment, the thickness of the receiving spar caps is tapered down over an overlap between the receiving spar section and the extending spar section. Tapering facilitates ease of insertion and removal and may allow bending loads to be transmitted with less shear stress on connecting webs When joining two blade portions, shear forces may occur between these blade portions when the blade rotates. It may thus be an advantage, if the spar sections are dimensioned relative to each other so that shear forces between one of the spar sections and the spar bridge can be taken directly between the receiving webs and the extending webs. The spar sections may be optimised for a dominant flatwise bending moment from aerodynamic thrust loads over the lesser edgewise gravity dominated loads.

As an example, the shear forces may be taken between the receiving webs and the extending webs via interlocking shapes and contact between the receiving webs and the extending webs. Interlocking shapes should be understood to define shapes which prevent or at least minimize movement of the extending webs and the receiving webs relative to each other in a cross-sectional plane. Thus, the spar caps may primarily resist bending loads, whereas the webs may primarily resist shear being primarily from the flatwise direction.

In one embodiment, the receiving webs and the extending webs may have a hexagonal shaped cross-section, whereas the webs in an alternative embodiment may have corresponding protrusions and indentations facilitating that the receiving spar section and the extending spar section are locked relative to each other.

To further increase the level of locking of the extending spar section and the receiving spar section relative to each other, a position of the interlocking shapes of the receiving webs and the extending webs relative to each other may be supported by a support member extending transverse to the lengthways direction. As an example, the support member may be one or more bolt and nut assemblies.

In one embodiment, the receiving spar section may form a cavity with a shape which matches the shape of the extension so that contact between an inner surface of the cavity and an outer surface of the extension is established in the vicinity of the joint and so that a space between the inner surface of the cavity and the outer surface of the extension is established further away from the joint.

When contact is established between the outer surface of the extension and the inner surface of the cavity in the vicinity of the joint movement of the extension relative to the receiving spar section may be limited or even avoided.

On the contrary, a space between the inner surface of the cavity and the outer surface of the extension further away from the joint may leave space for an additional fastening member which may further facilitate fastening of the extension relative to the cavity of the receiving section.

As an example, the fastening member may be located in a seat having an inner shape which matches the outer shape of the free end of the extension. The fastening member may form part of the receiving spar or may be a separate element which can be fastened to the receiving spar.

To facilitate transportation of the sectional blade, at least one of the spar sections may comprise an outer surface which forms part of an aerodynamically active outer surface of the blade.

Thus, at least one of the spar sections may not be completely encapsulated within very turbine blade shell parts. Hence, the spar may easier be transported from a manufacturing site to an assembly site compared to large blade shells or complete blades. The assembly site can be situated close to the place where the turbine blade it to be used.

The blade may further comprise a fixing member being adapted to fix the spar bridge to at least one of the spar sections. As an example, the fixing member may comprise a bolt, a rivet or the like, extending transverse to the length of the blade portion and the spar bridge, and through both of them to facilitate fixing of the spar bridge to the blade portion in question, e.g. by attaching a nut to one end of the bolt. As a single bolt or rivet may in some embodiments not be sufficient of fix the spar bridge to the at least one blade portion, the fixing member may comprise a plurality of bolts, rivets, or other fixing elements.

Alternatively or additionally, the fixing member may comprise one or more bolts, rivets or the like extending longitudinal to the length of the blade portion and the spar bridge.

As a further alternative, the fixing member may comprise an adhesive adapted to bond at least one of the blade portions and the spar bridge together.

Other fixing members may also be used. The above examples of fixing members may be used separately or may be combined.

Equal fixing members may be used to fix the spar bridge to both blade portions. Alternatively, a common fixing member may be used to fix the spar bridge to both spar sections. In a further alternative embodiment, different fixing members may be used to fix the spar bridge to each of the spar sections. And as a further alternative, the spar bridge may be fixed to only one of the spar sections, as the spar bridge may form part for the other blade portion.

The blade may comprise a tension member arranged lengthways to provide tension between the first blade portion and the second blade portion to establish a pre-tensioned connection between the blade portions. The tension member may form part of the fixing member or may be a separate element in addition to the fixing member or as an alternative to the fixing member.

The tension member may extend along the length of the spar bridge, e.g. along the full length of the spar bridge or along a part of the length. As an example, the tension member may be a steel rod or bolt, a cable of steel or Kevlar, or a pultruded element or in general any kind of element which is capable of providing a tension force by which the blade portions are pulled towards each other. The tension member may e.g. be an elastically deformable member which, when tension is established, provides a spring force keeping the blade portions together. The tension member may thus be pre-tensioned to maintain clamping force at the joint. Additionally deliberately softer compression members such as spring washers may form part of load path to hold the tension in other parts such as rods and bolts. This reduces fluctuating loads and fatigue distress in tension members.

When applying tension between the first and second blade portion, the blade portions are pressed towards each other. Since any kind of movement, e.g. rotation of one of the blade portions relative to the other blade portion, or deflection of the blade portions relative to each other, may only occur under elongation of the tension member, and since the tension member is already under tension, such relative movement of the blade portions may be prevented or limited or controlled based on the degree of tension applied by the tension member.

The blade may further comprise a tension adjustment structure facilitating readjustment of a tension in the tension member. In one embodiment, the tension member is held in tension by a threaded fastener element, e.g. by a bolt and nut element so that the threaded fastener, upon rotation of a part of the element relative to another part of the element or relative to the tension member pulls the tension member and provides tension therein based on the pitch of the threading.

To get access to the tension adjustment structure, one of the first or second blade portions may comprise an access hatch which when removed provides an opening in the blade portion providing access to the tension adjustment structure to facilitate readjustment of the tension.

The blade may further comprise a sensing structure for sensing a tension in the tension member. As an example, the sensing structure may sense a position of the previously mentioned treaded fastener element and thus provide indication of the tension in the tension member, and in another example, the sensing structure may comprise strain gauges or similar structures which are capable of sensing elongation of the tension member.

When being able to sense tension in the tension member, the tension may be adjusted if outside a predetermined range.

The tension member may comprise two opposite free ends, and at least one of the free ends may be fixed to a spar section. By fixing one end of the tension member to a spar section, assembling of the sectional blade may be facilitated as the number of parts to be assembled may be lowered.

When the sectional blade has been fully or partly assembled, tension may be provided between the first and second blade portion, e.g. by use of a threaded fastener element, thus providing a pre-tensioned connection between the blade portions.

To stabilise the joint, at least one of the blade portions may be provided with a bulkhead at the joint. Dependent on the size of the blade portion and the size of the spar bridge, a plurality of bulkheads may be used. The bulkhead(s) may furthermore ensure that the at least one blade portion is at least partly closed, so that unwanted items and dirt can be kept out of the inner of the blade portion.

As it may be an advantage if the first and second blade portions can be separated again after joining them, the joint may facilitate non-destructive separation of the blade portions from each other. This may especially be an advantage if a part of the blade needs repair or has to be replaced, as only the blade portion comprising the part in question needs to be replaced.

According to another aspect, the invention provides a sectional blade for a wind turbine, the blade comprising at least a first blade portion and a second blade portion extending in opposite directions from a joint, the first blade portion and the second blade portion being structurally connected by at least one spar bridge extending into both blade portions to facilitate joining of said blade portions, where said second blade portion forms a winglet.

The advantages hereof may be the facilitation of transport and the possibilities of retrofitting or repair of the blade tip as described previously.

In a second aspect, the invention provides a method of manufacturing a sectional blade for a wind turbine, the method comprising the steps of:

providing a first blade portion and a second blade portion;
arranging the blade portions so that they extend in opposite directions from a joint; and
structurally connecting the blade portions by use of a spar bridge.

It should be understood, that the features of the above-described first aspect of the invention may be applicable in relation to steps of the method of the second aspect of the invention.

In a third aspect, the invention provides a wind turbine comprising a sectional blade according to the first aspect of the invention. The sectional blade may be manufactured according to the second aspect of the invention. It should be understood, that the features of the first and second aspects previously described may also be applicable to the third aspect of the invention.

The wind turbine may comprise a control system connected to a sensing structure for sensing a tension in a tension member arranged to provide tension between the first blade portion and the second blade portion to establish a pre-tensioned connection between the blade portions.

As an example, the sensing structure may sense a position of the previously mentioned treaded fastener element and may thus provide indication of the tension in the tension member, and in another example, the sensing structure may comprise strain gauges or similar structures which are capable of sensing elongation of the tension member.

The sensing structure may provide the control system with information about the tension in the tension member. And the control system may be adapted to provide an alarm based on the tension, e.g. if the tension in the tension member is below a predetermined level.

Furthermore, the wind turbine may comprise a shut down structure adapted to stop operation of the wind turbine based on the tension, e.g. if the tension in the tension member is below a predetermined level. This predetermined level, i.e. a stop level, may be equivalent to the predetermined level which results in an alarm, i.e. an alarm level, but it may also be another predetermined level, as the alarm level may be different than the stop level, e.g. higher than the stop level.

In a fourth aspect, the invention provides a method of operating a wind turbine according to the third aspect of the invention, the method comprising a step of determining a tension in a tension member arranged to provide tension between the first blade portion and the second blade portion to establish a pre-tensioned connection between the blade portions.

It should be understood, that the features of the above-described first and second aspects of the invention may also be applicable in relation to steps of the fourth aspect of the invention.

The method may comprise a step of adjusting the tension in the tension member if the determined tension is outside a predetermined tension range. As both a too high tension level and a too low tension level may be unwanted, the predetermined tension range may comprise an upper and a lower level for the tension.

The method may further comprise a step of stopping further operation of the wind turbine if the tension in the tension member is below a predetermined level. Operation below this predetermined level may be dangerous, as a too low tension level may in the extreme situation result in separation of the first and second blade portions.

BRIEF DESCRIPTION OF THE DRAWINGS

Embodiments of the invention will now be further described with reference to the drawings, in which:

FIGS. 7a-7d illustrate sectional view of different embodiments of a sectional blade.

DETAILED DESCRIPTION OF THE DRAWINGS

Further scope of applicability of the present invention will become apparent from the following detailed description and specific examples. However, it should be understood that the detailed description and specific examples, while indicating preferred embodiments of the invention, are given by way of illustration only, since various changes and modifications within the scope of the invention will become apparent to those skilled in the art from this detailed description.

Figure 1:
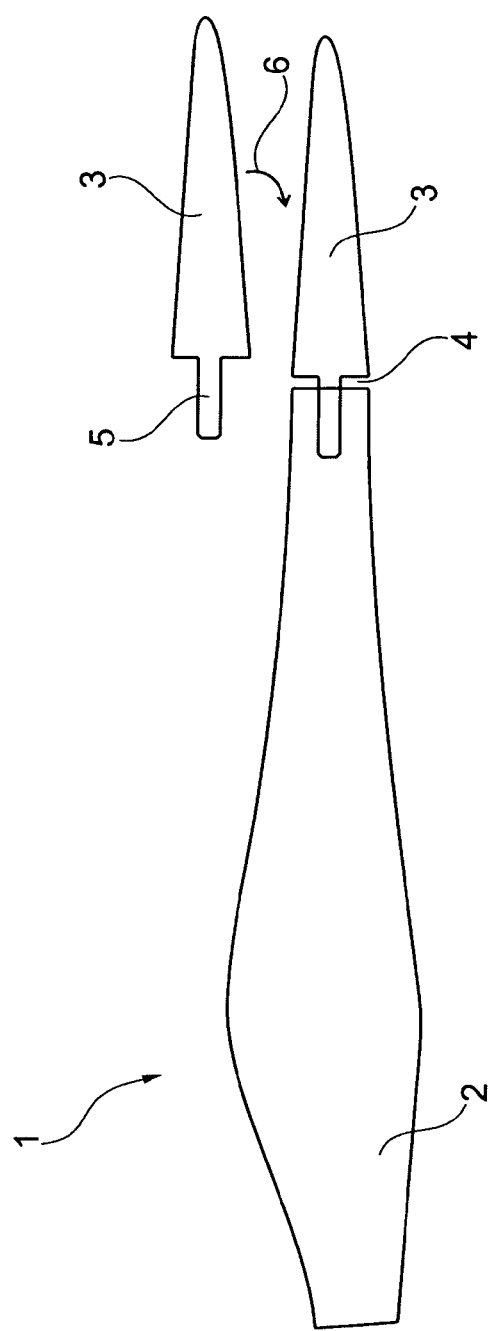
FIG. 1 illustrates an embodiment of a sectional blade comprising a first and a second blade portion.

FIG. 1 illustrates an embodiment of a sectional blade 1 for a wind turbine. The blade 1 comprises at least a first blade portion 2 and a second blade portion 3 extending in opposite directions from a joint 4. The first blade portion 2 and the second blade portion 3 are structurally connected by at least one spar bridge 5 extending into both blade portions 2, 3 to facilitate joining of said blade portions 2, 3.

The arrow 6 illustrates that the sectional blade 1 in the illustrated embodiment comprises two blade sections 2, 3, and that these blade sections 2, 3 are joined by inserting the spar bridge 5 into the first blade portion 2.

The illustrated spar bridge 5 is a longitudinal element being substantially box-shaped. It forms part of the longitudinal strength of the wind turbine blade 1, thus forming part of the reinforcement of the blade 1.

Figure 2:
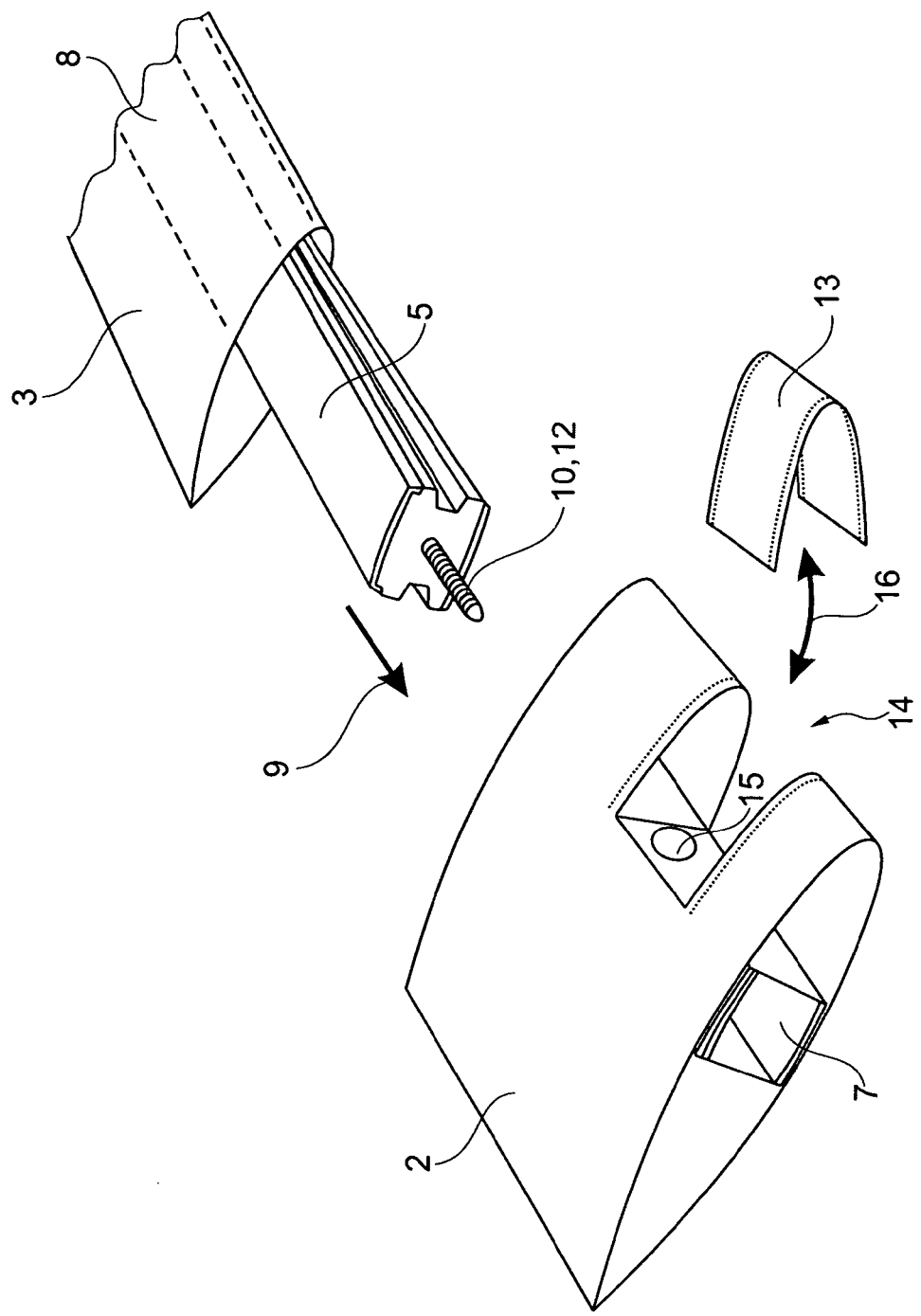
FIG. 2 illustrates an example of a joint between two blade portions.

As illustrated in FIG. 2 each blade portion 2, 3 comprises a spar section 7, 8 forming a structural member of the blade 1 and running lengthways. The spar sections 7, 8 are joined by the spar bridge 5. It should be understood, that for illustration purposes only parts of the blade portions 2, 3 are shown.

In the illustrated embodiment, the spar bridge 5 forms part of one of the blade portions 2, 3 and is consequently not a separate element. As illustrated, the spar bridge 5 forms part of the second blade portion 3 and comprises an extension protruding from the second spar sections 8, thereby forming an extending spar section. The first spar section 7 is adapted to receive the extension 8, and thereby forms a receiving spar section.

Both spar sections 7, 8 have an elongated form and the first spar section 7 is hollow to facilitate that the spar bridge 5 can be received in first the spar section 7. Thus, the spar bridge 5 can be inserted in the first spar section 7 allowing the blade sections to be joined around the spar bridge 5, as illustrated by the arrow 9. I.e. the first spar section 7 forms a cavity into which the spar bridge 5 extends when the first and the second blade portions 2, 3 are joined.

The blade 1 further comprises a fixing member 10 adapted to fix the spar bridge 5 to the first blade portion 2. In the present embodiment, the fixing member 10 comprises a rod extending longitudinal to the length of the first blade portion 2 and the spar bridge 5. The free end of the fixing member 10 is threaded allowing for attachment of a nut 11 (see FIG. 4) and thereby fixing of the spar bridge 5 to the first blade portion 2.

In the illustrated embodiment, the fixing member 10 is identical to a tension member 12 arranged to provide tension between the first blade portion 2 and the second blade portion 3 to establish a pre-tensioned connection between the blade portions 2, 3.

The tension member 12 extends along the length of the spar bridge 5. The tension member 12 is a rod which is capable of providing a tension force by which the blade portions 2, 3 are pulled towards each other. The tension member 12 is an elastically deformable rod which, when tension is established, provides a spring force keeping the blade portions 2, 3 together.

The blade 1 further comprises a tension adjustment structure 11 (see FIG. 4) facilitating readjustment of a tension in the tension member 12. In the illustrated embodiment, the tension member 12 is held in tension by a threaded fastener element, i.e. by the nut 11 so that the threaded fastener 11, upon rotation hereof relative to the tension member 12 pulls the tension member 12 and provides tension therein based on the pitch of the threading.

To get access to the tension adjustment structure 11, the first blade portion 2 comprises an access hatch 13 which when removed provides an opening 15 in the first blade portion 2 providing access to an opening 15 in the first spar section 7 providing access to the tension adjustment structure 11 (see FIG. 4), thus facilitating readjustment of the tension. The arrow 16 illustrates how the access hatch 13 can be used to close the opening 14.

Figure 3:
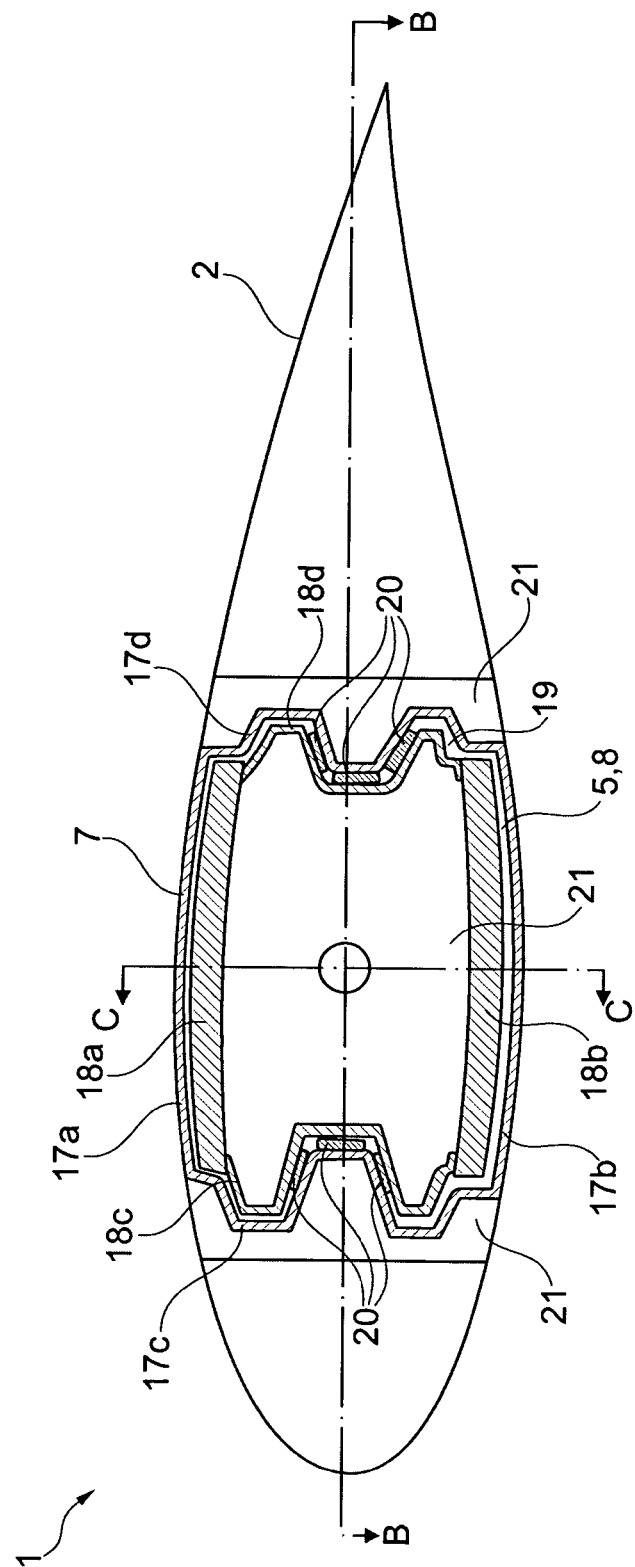
FIGS. 3, 4 and 5 illustrate different sectional views of an embodiment of a sectional blade.
Figure 4:
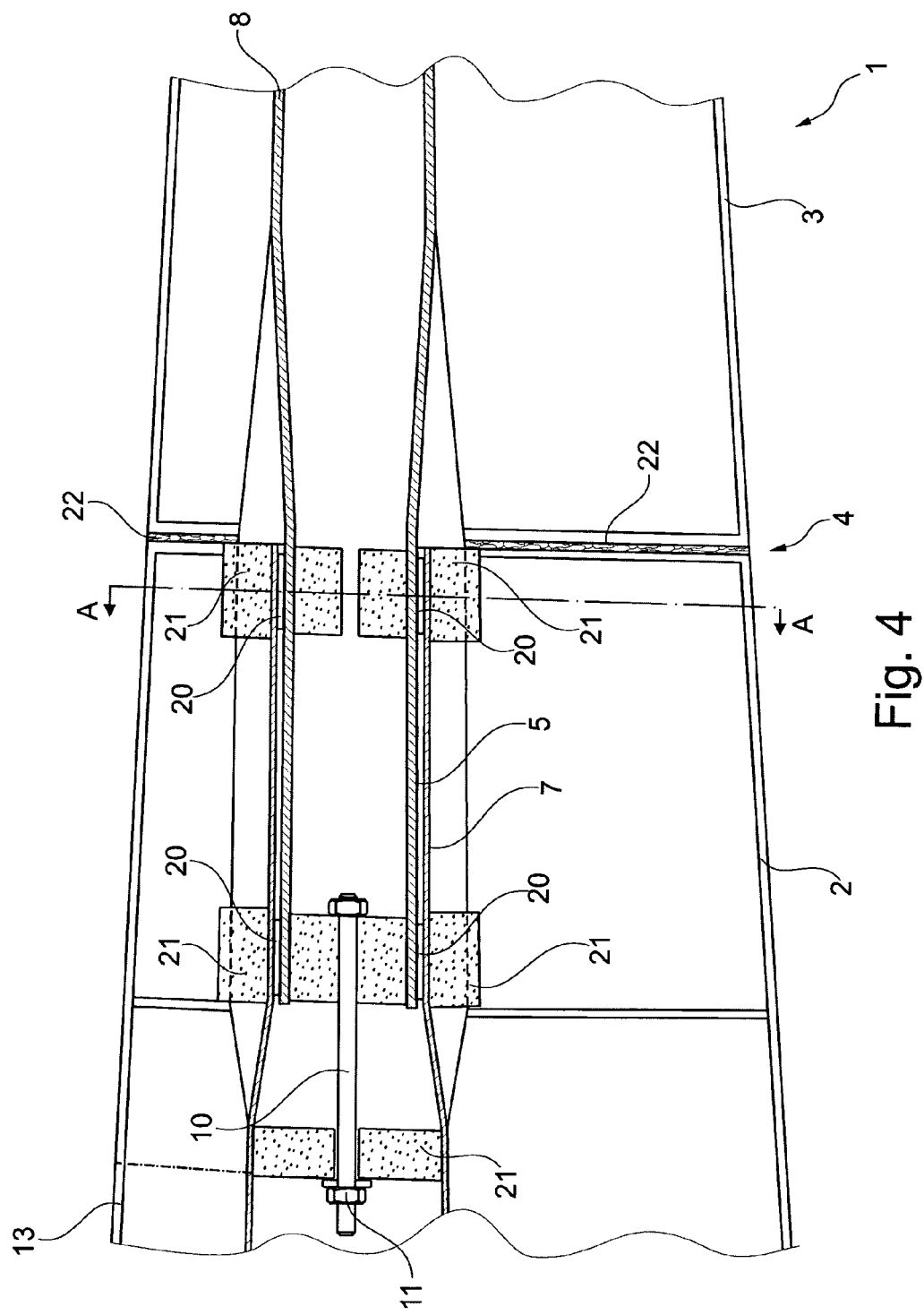
Figure 5:
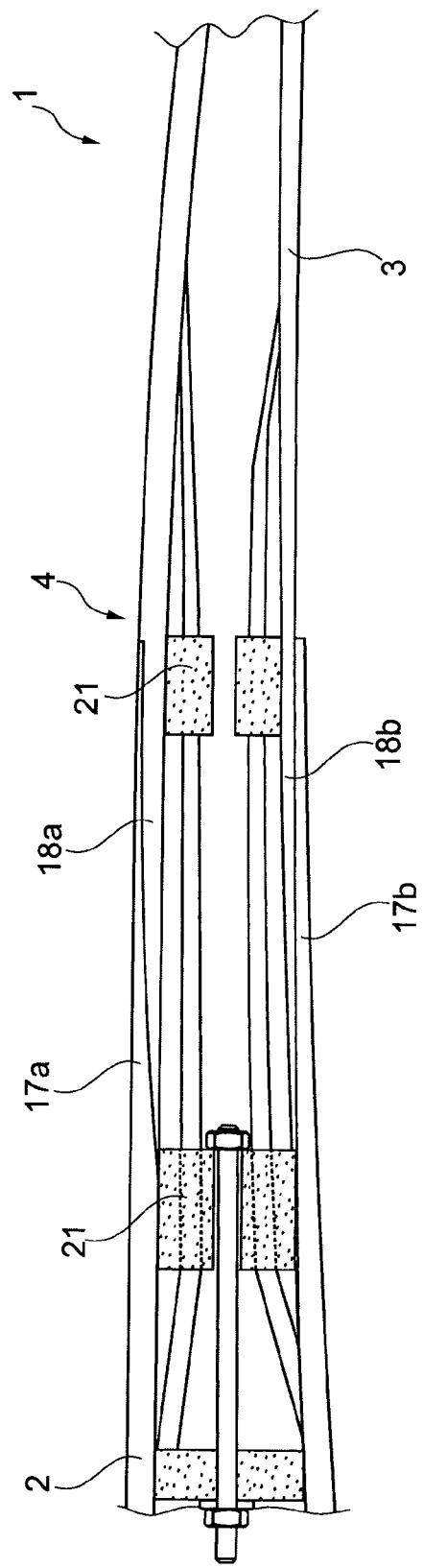

FIGS. 3, 4 and 5 illustrate different sectional views of an embodiment of a sectional blade 1. FIG. 3 illustrates a cross-sectional view of a sectional blade 1 through the first blade section 2. The positions of the sections BB and CC illustrated in FIGS. 4 and 5 can be seen in FIG. 3.

FIG. 3 illustrates how the extending spar section 8 (the spar bridge 5) extends into the cavity of the receiving spar section 7. As illustrated, the receiving spar section 7 comprises an upper receiving spar cap 17a and a lower receiving spar cap 17b. These receiving spar caps 17a, 17b are joined by receiving webs 17c, 17d. Likewise, the extending spar section 8 comprises an upper extending spar cap 18a and a lower extending spar cap 18b. These extending spar caps 18a, 18b are joined by extending webs 18c, 18d.

At this cross-section, a space 19 is located between the receiving spar section 7 and the extending spar section 8. Between the receiving webs 17c, 17d and the extending webs 18c, 18d a number of contact pads 20 of a wear-resistant material are positioned to reduce abrasion at areas loaded by contact pressure and to keep the position of the spar sections 7, 8 relative to each other.

To stabilise the joint, the first blade portion 2 is provided with a plurality of bulkheads 21 at the joint.

FIG. 4 illustrates section BB indicated in FIG. 3 with illustration of a plurality of contact pads 20 and a plurality of bulkheads 21. Furthermore, the access hatch 13 is illustrated. Via the access hatch 13 it is possible to get access to the tension adjustment structure 11. The joint 4 is sealed with an elastomeric seal 22.

FIG. 5 illustrates section CC indicated in FIG. 3 also illustrating the bulkheads 21 and the fixing member 10 and the nut 11.

Furthermore, it is illustrated how the thickness of the receiving spar caps 17a, 17b and the extending spar caps 18a, 18b is tapered down over and overlap between the receiving spar section 7 and the extending spar section 8.

Figure 6:
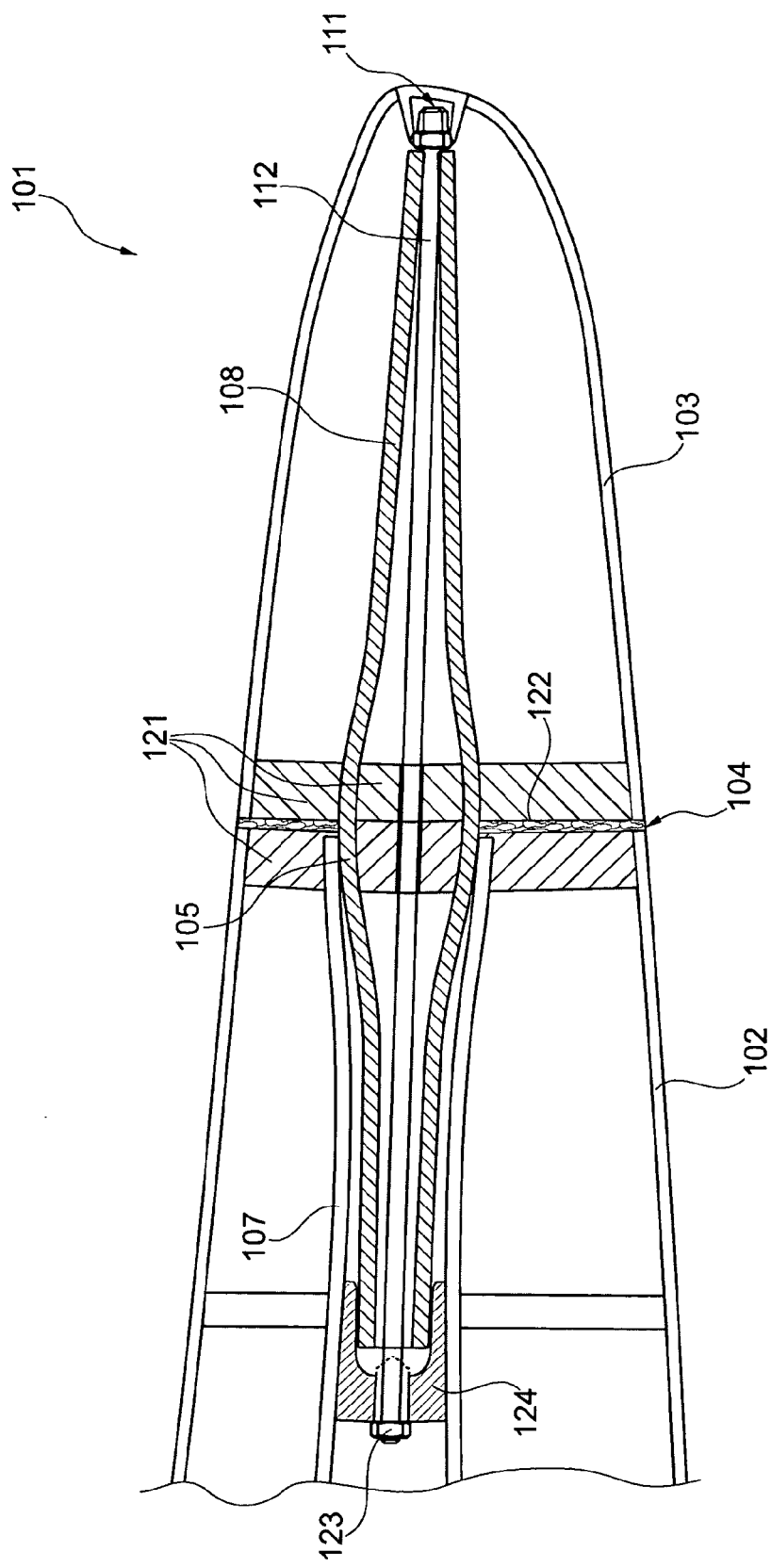
FIG. 6 illustrates a section view of another embodiment of a sectional blade.
Figure 8A:
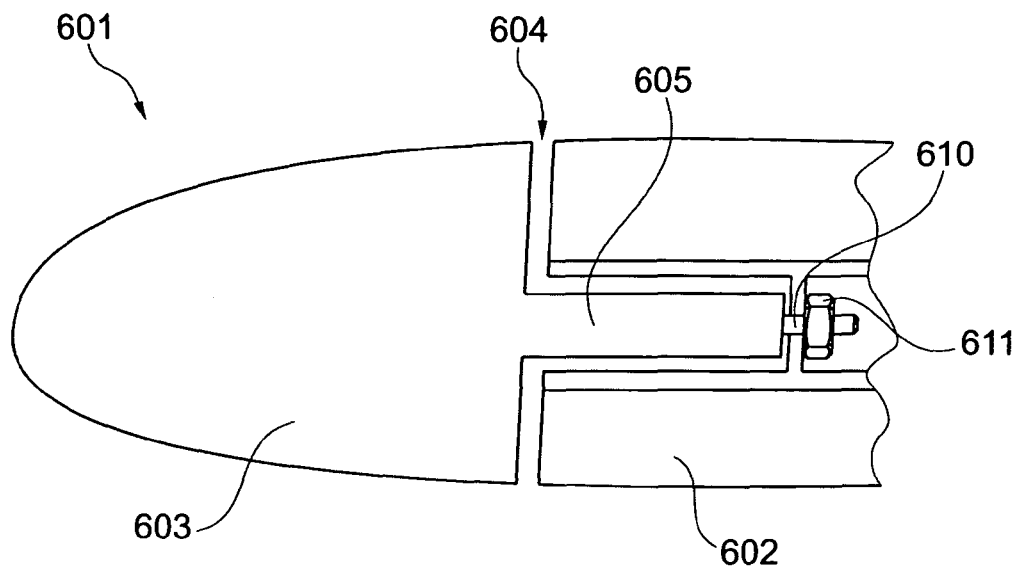
FIGS. 8a-8d illustrate sectional views of further alternative embodiments of a sectional blade.
Figure 8B:
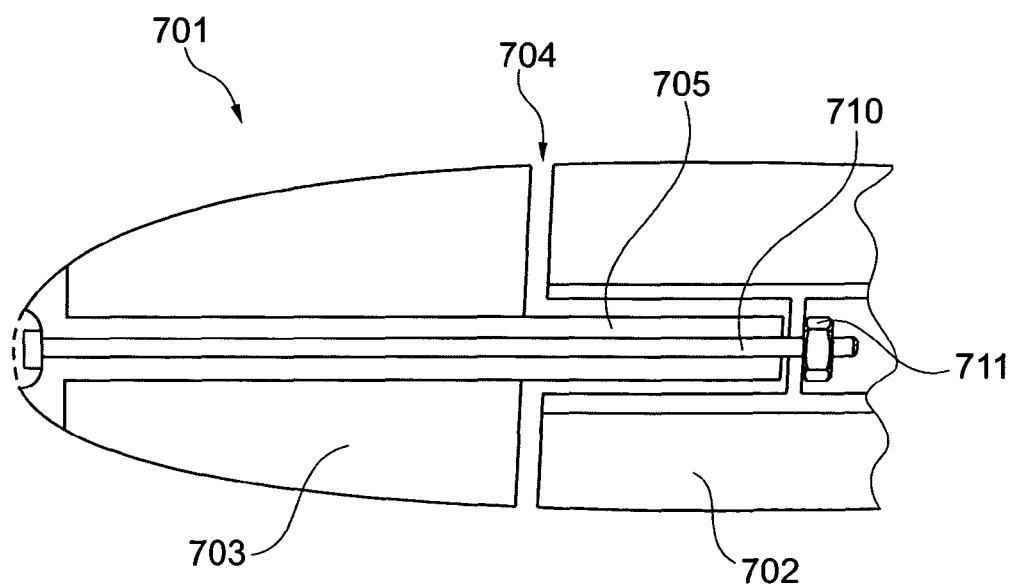
Figure 8C:
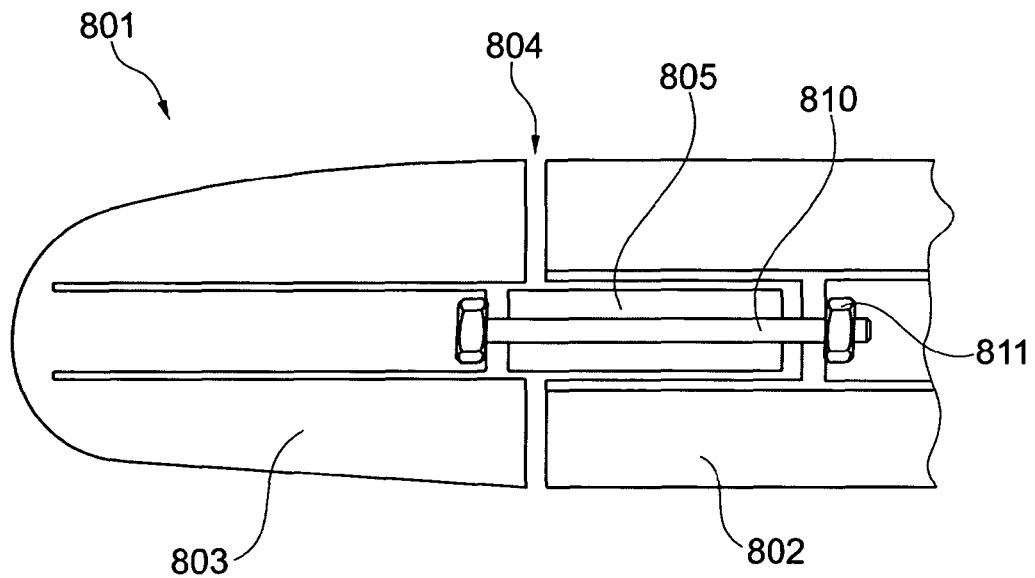
Figure 8D:
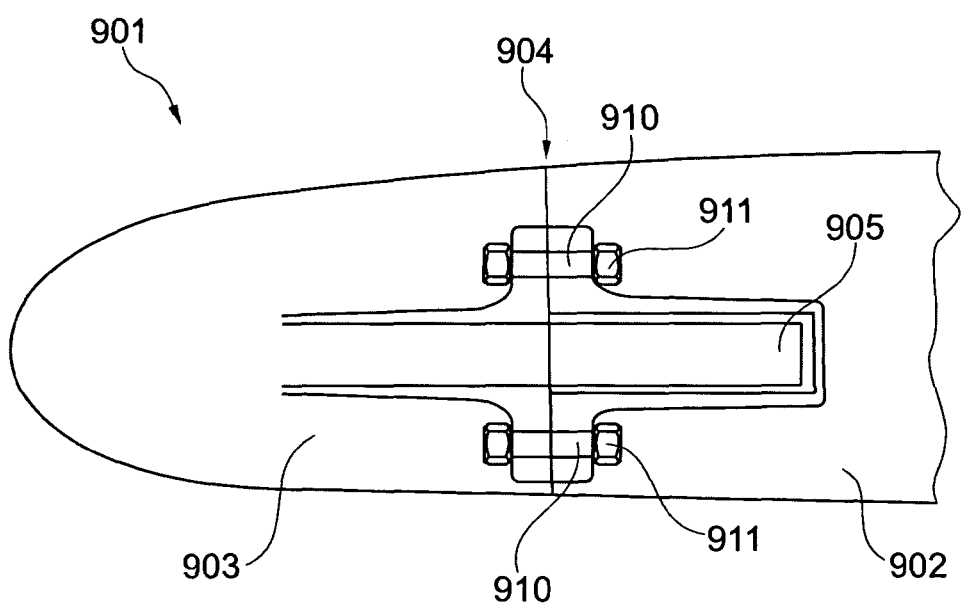

FIG. 6 illustrates a sectional view of an alternative embodiment of a sectional blade 101. The sectional blade 101 comprises at least a first blade portion 102 and a second blade portion 103. The first blade portion 102 comprises a first spar section 107 having a cavity and thus defines a receiving spar section 107. The second blade portion 103 comprises a second spar section 108 which is extending from the second blade portion 103 and thus defines an extending spar section 108. Thus, the spar bridge 105 forms part of the second spar section 108.

The blade 101 comprises a tension member 112 arranged to provide tension between the first blade portion 102 and the second blade portion 103 to establish a pre-tensioned connection between the first and second blade portions 102, 103.

The tension member 112 extends along the full length of the spar bridge 105. In the illustrated embodiment, the tension member 112 is a rod which is capable of providing a tension force by which the blade portions 102, 103 are pulled towards each other.

A tension adjustment member 111 is arranged at one end of the tension member 112. At the other end an additional fastening member comprising a nut 123 and a seat 124 is positioned. The seat 124 has an inner shape which matches the outer shape of the free end of the spar bridge 105, i.e. the free end of the extending spar section 108.

The joint 104 is provided with a plurality of bulkheads 121 and is sealed with an elastomeric seal 122.

FIGS. 7a-7d illustrate sectional views of different embodiments of a sectional blade 201, 301, 401, 501. The embodiments show different options for shear transfer between the webs.

When joining two blade portions, shear forces may occur between these blade portions when the blade rotates. Consequently, the sectional blades 201, 301, 401, 501 illustrate different ways of dimensioning the spar sections relative to each other so that shear forces between one of the spar sections and the spar bridge can be taken directly between the receiving webs and the extending webs.

In the illustrated embodiments, the shear forces are taken between the receiving webs 217c, 217d, 317c, 317d, 417c, 417d, 517c, 517d and the extending webs 218c, 218d, 318c, 318d, 418c, 418d, 518c, 518d via interlocking shapes and contact between the receiving webs 217c, 217d, 317c, 317d, 417c, 417d, 517c, 517d and the extending webs 218c, 218d, 318c, 318d, 418c, 418d, 518c, 518d. The spar sections are optimised for the dominant flatwise bending moment form aerodynamic thrust loads over the lesser edgewise gravity dominant loads. Thus, the spar caps resist primarily bending loads, whereas the webs primarily resist shear which is primarily from the flatwise direction.

In FIG. 7a the receiving webs 217c, 217d and the extending webs 218c, 218d have a hexagonal shaped cross-section, whereas the receiving webs 317c, 317d and the extending webs 318c, 318d in FIG. 7b have a substantially elongated shape with an ingoing part positioned at the middle part hereof.

In FIG. 7c the receiving webs 417c, 417d and the extending webs 418c, 418d have corresponding protrusions and indentations facilitating that the receiving spar section 407 and the extending spar section 408 are locked relative to each other.

In FIG. 7d the receiving webs 517c, 517d and the extending webs 518c, 518d have a substantially elongated shape. These corresponding interlocking shapes are supported by a fixing member 510 in the form of a bolt extending transverse to the length of the blade and extending through the receiving spar section 507 and the extending spar section 508.

FIGS. 8a-8d illustrate sectional views of different embodiments of a sectional blade 601, 701, 801, 901. Each of the sectional blades 601, 701, 801, 901 comprises a first blade portion 602, 702, 802, 902 and a second blade portion 603, 703, 803, 903 extending in opposite directions from a joint 604, 704, 804, 904. The embodiments show different options for restraint of the separating or longitudinal forces of the joint.

The first blade portion 602, 702, 802, 902 and the second blade portion 603, 703, 803, 903 are structurally connected by at least one spar bridge 605, 705, 805, 905.

The blade 601, 701, 801, 901 further comprises a fixing member 610, 710, 810, 910 adapted to fix the spar bridge 605, 705, 805, 905 to the first blade portion 602, 702, 802, 902. In the present embodiments, the fixing member 610, 710, 810, 910 comprises one or more bolts extending longitudinal to the length of the blade 601, 701, 801, 901. The free end of the fixing member 610, 710, 810, 910 is threaded allowing for attachment of a nut 611, 711, 811, 911 and thereby fixing of the spar bridge 605, 705, 805, 905 to the first blade portion 602, 702, 802, 902.

Figure 9:
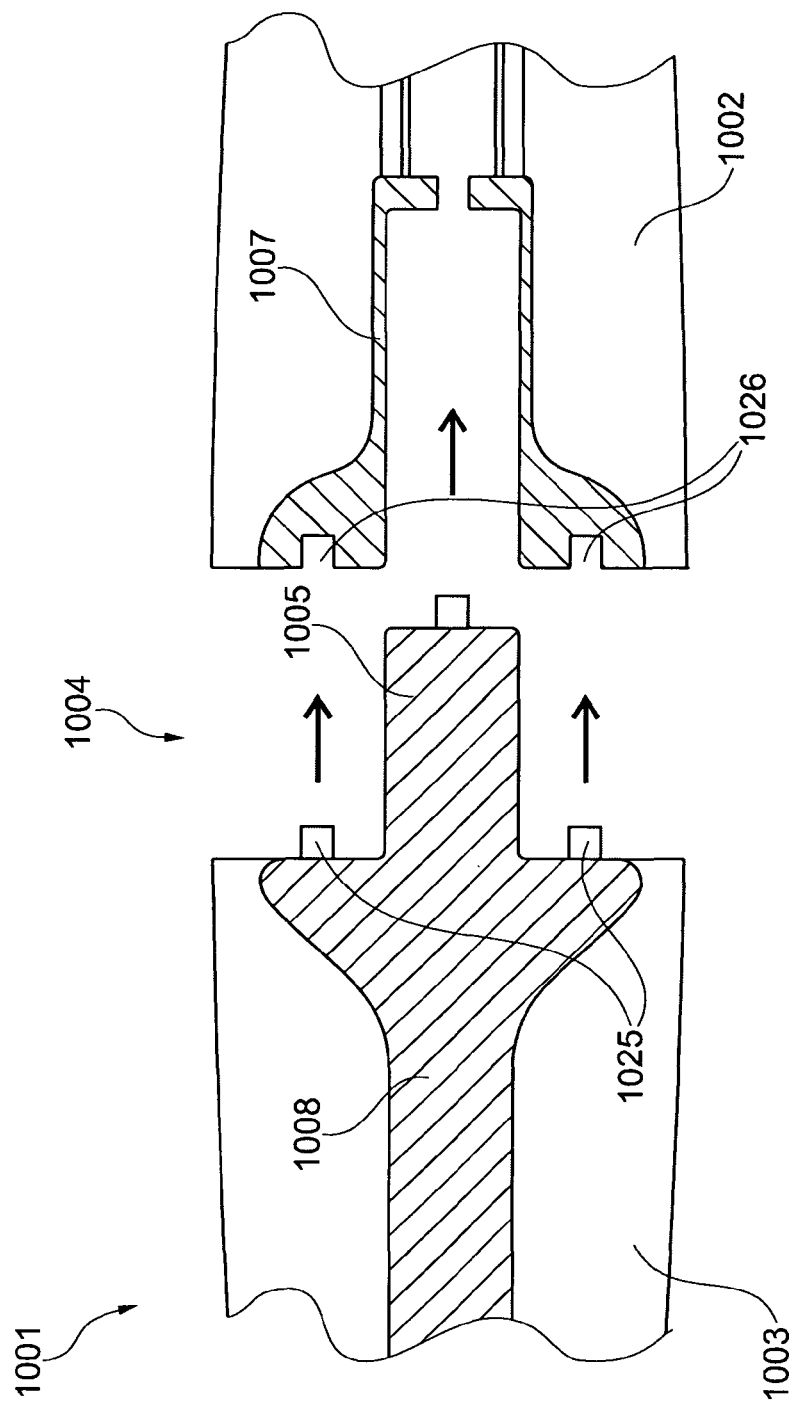
FIG. 9 illustrates a sectional view of an alternative embodiment of a sectional blade.

FIG. 9 illustrates an embodiment of a sectional blade 1001 for a wind turbine. The embodiment exemplifies and option for shear transfer at the joint. The blade 1001 comprises at least a first blade portion 1002 and a second blade portion 1003 extending in opposite directions from a joint 1004. The first blade portion 1002 and the second blade portion 1003 are structurally connected by at least one spar bridge 1005.

The spar bridge 1005 is a longitudinal element forming part of the longitudinal strength of the wind turbine blade 1001, thus forming part of the reinforcement of the blade 1001.

Each blade portion 1002, 1003 comprises a spar section 1007, 1008 forming a structural member of the blade 1001 and running lengthways. The spar sections 1007, 1008 are joined by the spar bridge 1005. It should be understood, that for illustration purposes only parts of the blade portions 1002, 1003 are shown.

The spar bridge 1005 forms part of the second spar section 1008 and thereby forms an extension protruding here from, thus forming an extending spar section 1008, whereas the first spar section 1007 comprises a cavity adapted to receive the extension, thus forming a receiving spar section 1007.

Furthermore, the spar bridge 1005 comprises two spar extensions 1025 adapted to be received in two spar indentations 1026 to further facilitate fixing of the first blade portion 1002 and the second blade portion 1003 relative to each other.

The invention claimed is:

1. A sectional blade for a wind turbine, the blade comprising:
    at least a first blade portion and a second blade portion extending in opposite directions from a joint, where each blade portion comprises a spar section forming a structural member of the blade and running lengthways, and
    at least one spar bridge extending into both the first blade portion and the second blade portion for structurally connecting said blade portions,
    wherein the spar bridge comprises an extension protruding from one of the spar sections and thereby forms an extending spar section, and wherein the other one of the spar sections is adapted to receive the extension and thereby forms a receiving spar section,
    wherein the spar bridge comprises two extending spar caps joined with two or more extending webs, and the receiving spar section comprises two receiving spar caps joined with two or more receiving webs, the receiving spar caps having a thickness that is tapered down toward the joint,
    wherein the extending webs and the receiving webs overlap each other when the extending spar section is received in the receiving spar section so that shear forces between one of the spar sections and the spar bridge can be taken between the receiving webs and the extending webs, and
    wherein a plurality of contact pads are positioned between the receiving webs and the extending webs in a space defined between the receiving spar section and the extending spar section.

2. The blade according to claim 1, wherein at least one spar section forms a cavity, and wherein the spar bridge extends into said cavity.

3. The blade according to claim 1, wherein the spar bridge terminates axially in an end at which it has a cross-section which is smaller relative to that of a mid section at the joint.

4. The blade according to claim 1, wherein a thickness of the extending spar caps is tapered down away from the joint.

5. The blade according to claim 4, wherein the thickness of the receiving spar caps is tapered down over an overlap between the receiving spar section and the extending spar section.

6. The blade according to claim 1, wherein the shear forces are taken between the receiving webs and the extending webs via interlocking shapes and contact between the receiving webs and the extending webs.

7. The blade according to claim 6, wherein a position of the interlocking shapes of the receiving webs and the extending webs relative to each other is supported by a support member extending transverse to the lengthways direction.

8. The blade according to claim 1, wherein the receiving spar section forms a cavity with a shape which matches the shape of the extension so that contact between an inner surface of the cavity and an outer surface of the extension is established in the vicinity of the joint and so that a space between the inner surface of the cavity and the outer surface of the extension is established further away from the joint.

9. The blade according to claim 1, wherein at least one of the spar sections forms part of an aerodynamic outer surface of the blade.

10. The blade according to claim 1, further comprising a fixing member being adapted to fix the spar bridge to at least one of the spar sections.

11. The blade according to claim 1, further comprising a tension member arranged lengthways to provide tension between the first blade portion and the second blade portion.

12. The blade according to claim 11, further comprising a tension adjustment structure facilitating readjustment of a tension in the tension member.

13. The blade according to claim 11, further comprising a sensing structure for sensing a tension in the tension member.

14. The blade according to claim 11, wherein the tension member comprises two opposite free ends, at least one of the ends being fixed to a spar section.

15. The blade according to claim 1, wherein at least one of the blade portions is provided with a bulkhead at the joint.

16. The blade according to claim 1, wherein the joint facilitates non-destructive separation of the blade portions from each other.

17. The blade according to claim 1, wherein said second blade portion forms a winglet.

18. A wind turbine comprising:
    a sectional blade, the blade comprising:
        at least a first blade portion and a second blade portion extending in opposite directions from a joint, where each blade portion comprises a spar section forming a structural member of the blade and running lengthways, and
        at least one spar bridge extending into both the first blade portion and the second blade portion for structurally connecting said blade portions,
    wherein the spar bridge comprises an extension protruding from one of the spar sections and thereby forms an extending spar section, and wherein the other one of the spar sections is adapted to receive the extension and thereby forms a receiving spar section,
    wherein the spar bridge comprises two extending spar caps joined with two or more extending webs, and the receiving spar section comprises two receiving spar caps joined with two or more receiving webs, the receiving spar caps having a thickness that is tapered down toward the joint,
    wherein the extending webs and the receiving webs overlap each other when the extending spar section is received in the receiving spar section so that shear forces between one of the spar sections and the spar bridge can be taken between the receiving webs and the extending webs, and wherein a plurality of contact pads are positioned between the receiving webs and the extending webs in a space defined between the receiving spar section and the extending spar section.

\* \* \* \* \*